United States Patent
Bjerge et al.

(10) Patent No.: US 8,511,182 B2
(45) Date of Patent: Aug. 20, 2013

(54) DETERMINING AN ACCUMULATED LOAD OF A WIND TURBINE IN ANGULAR SECTORS

(71) Applicants: Martin Huus Bjerge, Kibæk (DK); Per Egedal, Herning (DK); Hans Laurberg, Århus C (DK)

(72) Inventors: Martin Huus Bjerge, Kibæk (DK); Per Egedal, Herning (DK); Hans Laurberg, Århus C (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/677,365

(22) Filed: Nov. 15, 2012

(65) Prior Publication Data

US 2013/0125632 A1 May 23, 2013

(30) Foreign Application Priority Data

Nov. 23, 2011 (EP) .................................. 11190278

(51) Int. Cl.
*G01L 1/00* (2006.01)
(52) U.S. Cl.
USPC .................................................. 73/862.381
(58) Field of Classification Search
USPC .................................................. 73/862.381
See application file for complete search history.

(56) References Cited

U.S. PATENT DOCUMENTS

| 7,805,205 | B2 * | 9/2010 | Santos ........................... 700/28 |
| 8,033,788 | B2 * | 10/2011 | Egedal et al. ................... 416/43 |
| 8,105,029 | B2 * | 1/2012 | Egedal et al. ................... 416/33 |
| 8,222,757 | B2 * | 7/2012 | Schulten ........................ 290/44 |
| 8,255,173 | B2 * | 8/2012 | Fujioka et al. ................. 702/42 |
| 2004/0151575 | A1 | 8/2004 | Blakemore et al. |
| 2009/0180875 | A1 | 7/2009 | Egedal |
| 2011/0018271 | A1 | 1/2011 | Hayashi et al. |

FOREIGN PATENT DOCUMENTS

| EP | 2060785 A1 | 5/2009 |
| EP | 2249029 A2 | 11/2010 |
| EP | 2325480 A1 | 5/2011 |

\* cited by examiner

*Primary Examiner* — Lisa Caputo
*Assistant Examiner* — Octavia D. Hollington

(57) ABSTRACT

A method for determining a total mechanical load of a wind turbine is provided. A present load signal indicative of a present load of a wind turbine base structure is obtained, wherein the present load acts in a present angular direction. A first present load and a second present load are derived based upon the present load signal and the present angular direction, wherein the first present load is associated with a first angular sector of the turbine and the second present load is associated with a second angular sector of the turbine. Further, a total mechanical load is derived based upon the first present load and the second present load.

17 Claims, 3 Drawing Sheets

DETERMINING AN ACCUMULATED LOAD OF A WIND TURBINE IN ANGULAR SECTORS

CROSS REFERENCE TO RELATED APPLICATIONS

This application claims priority of European Patent Office Application No. 11190278.9 EP filed Nov. 23, 2011. All of the applications are incorporated by reference herein in their entirety.

FIELD OF INVENTION

A method and an arrangement for determining a total mechanical load of a wind turbine are provided, wherein the total mechanical load is determined for a plurality of angular sectors of the wind turbine.

ART BACKGROUND

Due to impact of wind on a wind turbine, components of the wind turbine, in particular components below a nacelle of the turbine which have a fixed position relative to a ground may experience strain, stress and wear. In particular, the tower structure and/or the foundation of the wind turbine may be impaired over time due to the load experienced by the impacting wind.

Document US 2011/018271 A1 discloses a device and a method of adjusting curtailment strategy for a wind turbine, wherein a fatigue equivalent load calculation unit calculates a fatigue equivalent load for evaluating a fatigue damage of the wind turbine in a predetermined time period by using load data of the wind turbine.

However, it has been observed that conventional methods for determining a load of a wind turbine are not satisfactory in terms of accuracy such that the actual load of the wind turbine may deviate from the load estimated by the respective prediction method.

SUMMARY OF THE INVENTION

There may be a need for a method and arrangement for determining a total mechanical load of a wind turbine, wherein the determined load reflects the actual load of the wind turbine in a more accurate and more reliable manner. Further, there may be a need for a method for controlling a wind turbine using a thus determined total mechanical load.

This need may be met by the subject matter according to the independent claims Advantageous embodiments are described by the dependent claims.

According to an embodiment, a method for determining a total mechanical load of a wind turbine is provided, the method comprising: obtaining a present (mechanical) load signal indicative of a present (mechanical) load (or stress of strain or wear) of a wind turbine base structure (including a tower and a foundation), the present load acting in a present angular direction; deriving a first present load and a second present load based on the present load signal and the present angular direction, wherein the first present load is associated with a first angular sector of the turbine and the second present load is associated with a second angular sector (different from the first sector) of the turbine; deriving the total mechanical load based on the first present load and the second present load.

The mechanical load of the wind turbine may reflect mechanical strain, stress and/or wear of components of the wind turbine base structure, wherein the wind turbine base structure may in particular include all components of the wind turbine below the nacelle of the wind turbine at which plural rotor blades are connected to a rotation shaft. The mechanical load may for example comprise bending, deflection, vibration of the components of the turbine base structure over prolonged time intervals, wherein the deflections, strain, stress and/or wear may occur along a present angular direction (e.g. a present wind direction or a present direction of the nacelle oriented along a rotation shaft towards the wind). Over time the present angular direction may change such that the load acts in the present angular direction at a present time point and a subsequent load acts in a subsequent angular direction at a subsequent time point, wherein the subsequent time point is temporarily after the present time point.

The present angular direction may describe a direction perpendicular to a longitudinal axis of the wind turbine tower and may for example be specified by a present angle in a coordinate system fixed to the wind turbine tower and also fixed to the foundation of the wind turbine. In particular, the present angular direction may correspond to a projection of the present wind direction onto this coordinate system which may span a plane defined by two coordinate axis, wherein the plane may represent a tangential surface, in particular plane, arranged at the bottom of the wind turbine tower tangentially to the earth surface.

In particular, the first present load may indicate the present load in a direction of the first angular sector and the second present load may indicate a load in a direction to the second angular sector. In particular, the first angular sector may be a sector of the wind turbine base structure spanning a particular angular interval, such as between 5° and 180°, in particular between 30° and 120°, further in particular between 60° and 100°, in particular spanning exactly 90°. Thereby, it may be taken into account that only a first portion of the present load acts in fact in the direction of the first angular section and only a second portion of the present load acts in the direction to the second angular sector. Thereby, an angularly resolved load monitoring of the wind turbine may be performed.

The total mechanical load may comprise a vector of load components corresponding to different angular directions. In particular, beside the first present load and the second present load a plurality of other present loads may be comprised in the total mechanical load, wherein each load component correspond to the load experienced by a associated angular direction or angular range of directions.

When deriving the first present load and the second present load the present angular direction as well as the angular position (or angular mid point) of the first angular sector and the angular position (or angular mid point) of the second angular sector may be taken into account.

In this manner, the present (in particular measured) load may be distributed into the first present load and the second present load, wherein the distribution may be unequal depending on a deviation between the present angular direction and the angular position of the first angular sector and also depending on a deviation between the present angular direction and an angular position of the second angular sector.

In a conventional system, it may be assumed that the load experienced by the wind turbine is always acting in the same direction during the whole life time of the tower or foundation of the wind turbine. According to this conventional procedure this may result in a very conservative load estimation for the tower or foundation of the wind turbine.

According to this embodiment, it is taken into account along which direction the load is acting and the experienced load is monitored in an angularly resolved manner such as to associate each angular sector with a respective experienced mechanical load. By determining the mechanical load for a number of different angular sectors the actually experienced load in each sector can be monitored more accurately, enabling a very accurate estimation of the load experienced in the different sectors.

Obtaining the present load signal may either comprise measuring a suitable signal or estimating the present load signal from a preliminary signal from which the present load signal may be derivable. In particular, the present load signal may comprise an acceleration signal, in particular measured in the wind direction and perpendicular to the wind direction, in particular if an acceleration sensor is fixedly mounted within the nacelle of the wind turbine, wherein the nacelle is usually directed towards the wind, such that the wind direction substantially coincides with the rotation shaft supported within the nacelle.

According to an embodiment, the method further comprises: obtaining a subsequent load signal indicative of a subsequent load of the wind turbine base structure, the subsequent load acting in a subsequent angular direction; deriving a first subsequent load and a second subsequent load based on the subsequent load signal and the subsequent angular direction, wherein the first subsequent load is associated with the first angular sector and the second subsequent load is associated with the second angular sector; wherein the deriving the total mechanical load comprises forming a first total mechanical load by summing the first present load with the first subsequent load and forming a second total mechanical load by summing the second present load with the second subsequent load.

The subsequent load signal may be obtained at or may relate to a subsequent time point which is temporarily after the present time point. The manner of deriving the first subsequent load and the second subsequent load may be similar as the procedure for deriving the first present load and the second present load. In particular, at the present time point the present load may be represented as a vector of present load components, wherein each present load component is associated with a particular angular sector. In particular, the subsequent mechanical load may be represented by a vector comprising a number of subsequent load components, wherein each subsequent load component is associated with a particular angular sector.

Deriving the total mechanical load may comprise a vector summation of the present mechanical load vector with the subsequent mechanical load vector. Thereby, an angle resolved total mechanical load may be obtained. Thereby, information regarding the experienced load in different directions may be provided. Thereby, the actual load experienced by the wind turbine may more accurately be monitored.

According to an embodiment, the deriving the total mechanical load comprises determining a maximum of the first total mechanical load and the second total mechanical load, to find the sector which has experienced the highest mechanical load. The particular angular sector (in particular the first angular sector or the second angular sector) for which the maximum occurs may be indicative of the sector where the highest load has been experienced. If this maximum exceeds a threshold it may indicate that operation of the wind turbine has to be altered or the operation of the wind turbine has to be shut down in order to avoid damage of this particular angular sector. Thereby, a warning message may be issued which may enable to take appropriate measures to adapt the operation of the wind turbine.

According to an embodiment, the deriving the total mechanical load comprises determining a maximum of the first present load and the second present load. In particular the first present load and the second present load may indicate a rate of change of the first total mechanical load and the second total mechanical load, respectively. Some components of the wind turbine may be sensitive or sensible to a particular load rate change which may be detected according to this embodiment. Thereby, it is enabled to adapt the operation of the wind turbine, if this load rate change exceeds a threshold, e.g.

According to an embodiment, the method further comprises obtaining at least one another present load signal indicative of another present load of the wind turbine base structure, the present load acting in another present angular direction; wherein the deriving the first present load and the second present load is further based on the other present load signal and the other present angular direction.

Also the other present load signal may either be measured or may be determined or derived from a preliminary signal which is at least indirectly indicative of the other present load. In particular, the other present angular direction is different from the present angular direction. In particular the difference may mount to between 30° and 120°, in particular may amount to 90°.

Taking into account the other present load signal acting along the other present angular direction may improve the accuracy of deriving the first present load and the second present load. In particular, the first present load and the second present load may be interpolated based on the present load and the other present load. The more present load signals are provided, the higher the accuracy may be with which the first present load and the second present load (and in particular even more present loads in even other directions) may be determined or derived. Thereby, the load estimation of the wind turbine may more accurately reflect the actual load experienced by the wind turbine.

According to an embodiment, the method further comprises obtaining a present yaw signal indicative of a present yaw angle of the wind turbine, using the yaw signal to determine the present angular direction.

The present yaw signal may indicate a rotational position of the nacelle of the wind turbine with respect to the wind turbine tower and/or the foundation of the wind turbine which may be fixedly connected to the ground. In particular, the yaw signal may also indicative of the wind direction, as the wind turbine is usually directed by yawing the nacelle, such that the rotation shaft supported within the nacelle is aligned or coincident with the wind direction (projected to the earth tangential plane). Thus, in particular from the present yaw signal the present angular direction (the direction along which the present load is acting) may be derivable.

According to an embodiment, the method may further comprise determining a wind direction or measuring a wind direction and deriving the present angular direction from the measured or determined wind direction. Thereby, the present method may be simplified.

According to an embodiment, the method further comprises deriving a third present load and a fourth present load based on the present load signal and/or the other present load signal and the present angular direction and/or the other present angular direction, wherein the third present load is associated with a third angular sector, in particular spanning 90°, of the turbine and the fourth present load is associated with a fourth angular sector, in particular spanning 90°, of the turbine, wherein in particular the first angular sector spans 90° and the second angular sector spans 90°.

Additionally, a plurality of other present load components may be derived which are associated with a respective plurality of angular sectors. The angular sectors may for example span an angle range between 10° and 180°, 30° and 150°, 60° and 120°, for example. Each angular sector of the plurality of angular sectors may be assigned a particular present load component (or subsequent load component or a plurality of subsequent load components) reflecting the estimated load experienced by this particular angular sector. Thereby, the accuracy of the estimation of the total mechanical load in a sector wise manner may be improved.

According to an embodiment, the present load signal comprises obtaining a present acceleration signal indicative for a present acceleration of the wind turbine in the present angular direction, in particular a present wind direction, and deriving the present load from the present acceleration signal and/or obtaining the other present load signal comprises obtaining another present acceleration signal indicative for another present acceleration of the wind turbine in the other present angular direction, in particular perpendicular to a present wind direction, and deriving the other present load from the other present acceleration signal.

The acceleration signal may for example be obtained from an accelerometer which is mounted within the wind turbine, in particular mounted within the nacelle. In particular, the accelerometer may be a two-axis accelerometer adapted to measure two accelerations in two orthogonal directions. Upon impact of wind the wind turbine base structure (in particular the wind turbine tower and/or the wind turbine foundation) may be caused to deflect and/or oscillate which involves accelerations. Thus, the measured acceleration may be closely related to experienced strain or stress or load of the wind turbine, in particular along the present angular direction. Since an accelerometer may usually be installed within the wind turbine, using the present acceleration signal and/or the other present acceleration signal, to derive the present load signal and/or the other present load signal, may simplify the method and may reduce the cost of the respective arrangement.

According to an embodiment, the method further comprises: deriving a first present acceleration and a second present acceleration based on the present acceleration signal and the present angular direction, wherein the first present acceleration is associated with the first angular sector of the turbine and the second present acceleration is associated with the second angular sector of the turbine; deriving the first present load based on the first present acceleration; deriving the second present load based on the second present acceleration.

Thereby, the present acceleration signal or the present acceleration may be distributed (or separated) into the first present acceleration (to represent the acceleration in direction of the first angular sector) and the second present acceleration (indicative of acceleration along or in the direction of the second angular sector). After distributing the present acceleration in the first present acceleration and the second present acceleration the first present load may be derived based on the first present acceleration and the second present load may be derived based on the second present acceleration. Thereby, a simple multiplication with a scaling factor may be applied. Thereby, the method may still further be simplified.

According to an embodiment, the present acceleration signal and/or the other present acceleration signals are obtained from an accelerometer, arranged in the wind turbine, in particular arranged within the nacelle of the wind turbine. Thereby, costs may be reduced.

According to an embodiment, the present load signal comprises obtaining a present strain signal indicative for a present strain of the wind turbine (affecting components located in line with) in the present angular direction, and deriving the present load from the present strain signal; and/or wherein obtaining the other load signal comprises obtaining another strain signal indicative for another present strain of the wind turbine (affecting components located in line with) in the other present angular direction, and deriving the other present load from the other present strain signal.

Thereby, in particular the present load signal may in fact correspond (or be equal) to the present strain signal and the other load signal may in fact correspond (or be equal) to the other strain signal.

The strain signals may be provided from a strain sensor, wherein a plurality of strain sensors may be installed at different angular positions (along a circumference or in a circumferential direction) of the wind turbine tower, in particular at a same height or at different heights. Thereby, existing equipment may be utilized to provide an input signal for the method.

According to an embodiment, the strain signal and/or the other strain signal is obtained from a strain sensor and/or another strain sensor, both in particular strain gauge sensors, wherein in particular the strain sensor is mounted at the wind turbine base structure within the first angular sector and the other strain sensor is mounted at the wind turbine base structure within the second angular sector.

According to an embodiment, the first present load is determined to decrease when an angle difference between the present angular direction and a central angle of the first angular sector increases, wherein in particular the first present load is derived as a product of the present load times a power of 3.5 of a cosine of the angle difference between the present angular direction and a central (or mid or average) angle of the first angular sector.

In particular, a particular present load component is determined to decrease, when an angle difference between the present angular direction (being associated with the referred present load component) and a central angle (or angular position) of the respective angular sector increases. Thereby, a simple reliable distribution method may be provided to distribute the present load to two angular sectors or a plurality of angular sectors. Thereby, an accurate distribution function may be provided for improving the estimation of the total mechanical load in a sector wise manner.

According to an embodiment, a method of controlling a wind turbine is provided, wherein the method comprises performing a method of determining a total mechanical load of a wind turbine, as described above, and controlling the wind turbine based on the determined total mechanical load. For example, the wind turbine may be shut down or the operation of the wind turbine may be altered in dependence of the determined total mechanical load. Thereby, a safe operation of the wind turbine may be ensured. In particular, the wind turbine may be operated for longer times than when the wind turbine would be operated based on load estimation of a conventional method.

It should be understood that features which are individually or in any combination disclosed, described, explained or provided for a method for determining a total mechanical load of a wind turbine may also be (individually or in any combination) applied for, provided for, or used for an arrangement for determining a total mechanical load of the wind turbine according to an embodiment and vice versa.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

According to an embodiment, an arrangement for determining a total mechanical load of a wind turbine is provided, the arrangement comprising: an input terminal to obtain a present load signal indicative of a present load of a wind turbine base structure, the present load acting in a present angular direction; a processor adapted to derive a first present load and a second present load based on the present load signal and the present angular direction, wherein the first present load is associated with a first angular sector of the turbine and the second present load is associated with a second angular sector of the turbine; and to derive the total mechanical load based on the first present load and the second present load.

The arrangement may be a portion or module or software component of a wind turbine controller.

The aspects defined above and further aspects are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments are now described with reference to the accompanying drawings.

DETAILED DESCRIPTION

Figure 1:
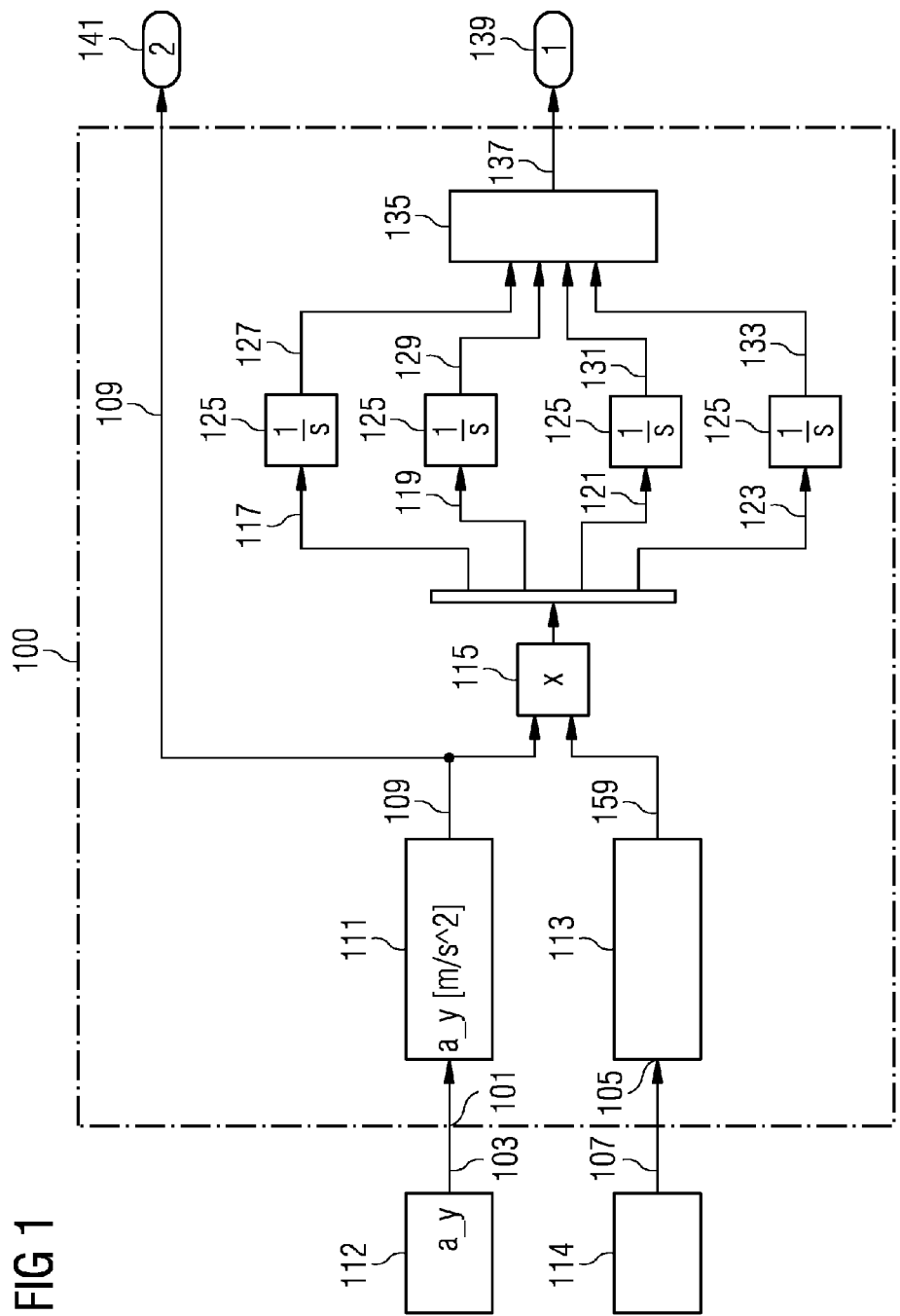
FIG. 1 schematically illustrates an arrangement for determining a total mechanical load according to an embodiment which is adapted to perform a method for determining a total mechanical load according to an embodiment.

The illustration in the drawings is in schematic form. It is noted that in different figures, similar or identical elements are provided with the same reference signs or with reference signs, which are different from the corresponding reference signs only within the first digit.

FIG. 1 schematically illustrates an arrangement 100 for determining a total mechanical load of a not illustrated wind turbine according to an embodiment.

The arrangement 100 comprises an input terminal 101 for receiving an acceleration signal 103 provided by an accelerometer 112, and an input terminal 105 for receiving a signal 107 indicative of a yaw position of the nacelle of the wind turbine provided by a yaw sensor 114. In this embodiment a present load signal 109 is derived from a load estimator 111 which is provided with the acceleration signal 103. In particular, the acceleration signal a_y corresponds to an acceleration in the forward-afterward-direction of the wind turbine representing a movement of the nacelle along the rotation shaft, since the accelerometer is installed within the nacelle such that the acceleration component a_y measures the acceleration of the nacelle along the direction of the rotation shaft which typically points into the direction of the wind. This may be the direction where the highest load is experienced by the wind turbine.

A load distribution module 113 receives the signal 107 indicative of the yaw position and derives a load distribution key or load distribution function 159 according to which the present load signal 109 is distributed using the multiplication element 115 into plural present load components 117, 119, 121, 123.

The present load components 117, 119, 121, 123 may represent or may be represented by a present load vector having these four load components. Using the integration elements 125 the present load components 117, 119, 121, 123 are (separately) integrated or summed or accumulated and the result of the summations 127, 129, 131 and 133 are delivered to a maximum determination module 135 which determines the maximum of the summations 127, 129, 131, 133 and outputs the maximum 137 at a terminal 139.

A further output of the arrangement 100 is the present load signal 109 which is output at the terminal 141. The maximum of the sums 127, 129, 131, 133 indicates the angular sector having experienced the highest load. Thereby, the angular sector having experienced the highest accumulated load may be identified and the wind turbine may be controlled in order to satisfy load limits.

Figure 2:
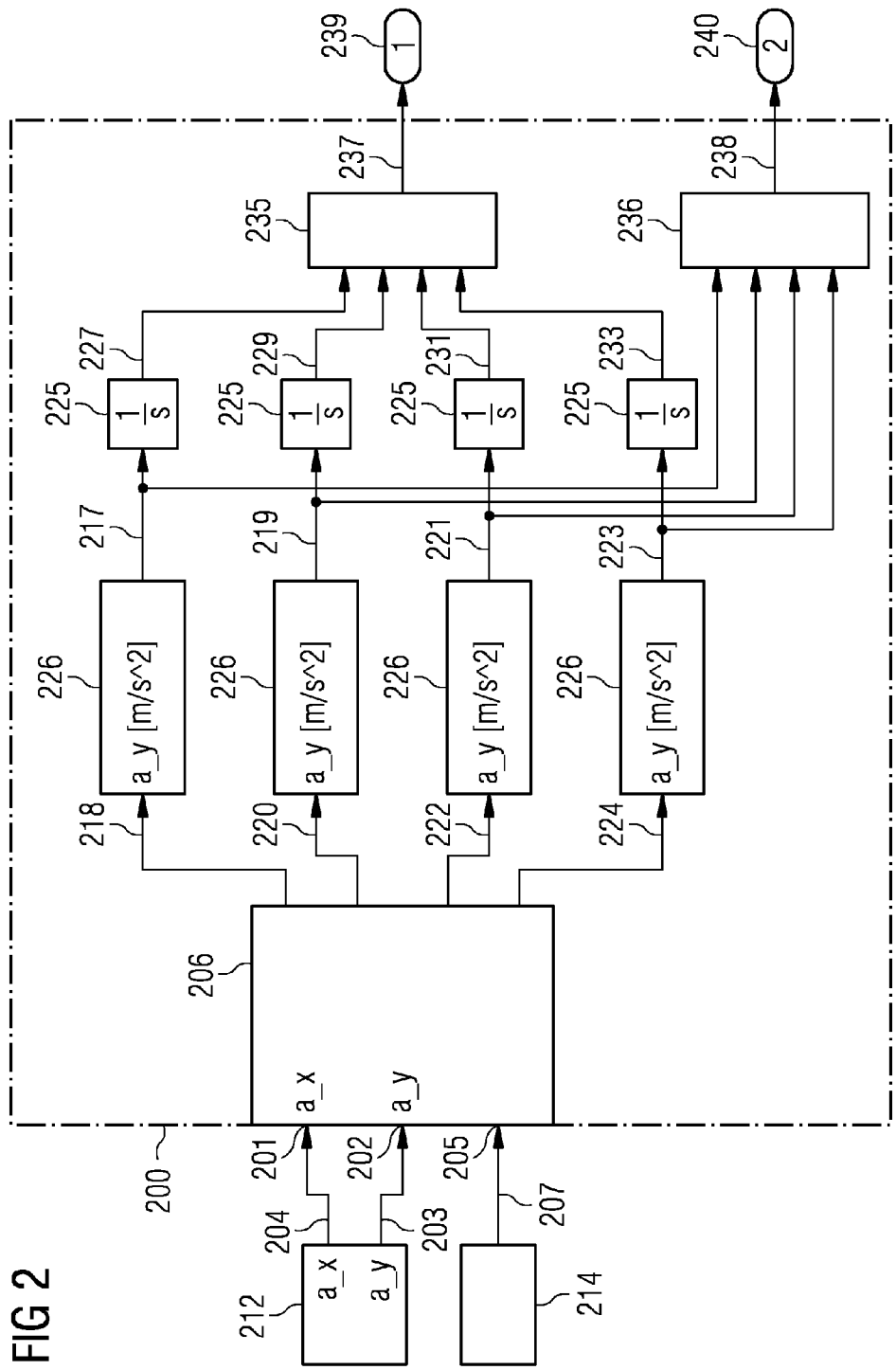
FIG. 2 schematically illustrates another embodiment of an arrangement for determining a total mechanical load of a wind turbine.

FIG. 2 schematically illustrates another arrangement 200 for determining a total mechanical load, wherein the arrangement 200 comprises input terminals 201, 202 for receiving a acceleration signal 203 and another acceleration signal 204, wherein the acceleration signal 203 corresponds to the signal a_y and the other acceleration signal corresponds to the acceleration component a_x measured by the accelerometer installed within the nacelle of the wind turbine. In particular, the component a_x is perpendicular to the component a_y.

The acceleration signals 203, 204 are supplied to a projection module 206 for projecting the acceleration components into (in particular four) different angular sectors. For the projection the projection module 206 comprises an input terminal 205 for obtaining or receiving a yaw position signal 207. The vector projection module 206 outputs a first present acceleration 218, a second present acceleration 220, a third present acceleration 222 and a fourth present acceleration 224 which are supplied to respective load estimator modules 226.

Based on the first present acceleration 218 the load estimator module 226 derives the first present load 217. Based on the second present acceleration 220 the load estimator 226 derives the second present load 219. Based on the third present acceleration 222 the load estimator module 226 derives the third present load 221 and based on the fourth present acceleration 224 the load estimator module 226 derives the fourth present load 223.

The present load components 217, 219, 221, 223 are separately supplied to respective integrator elements 225 which integrate temporarily subsequent present load components and supply sums 227, 229, 231, 233 to a maximum determination module 235 which determines the maximum 237 of the sums and provides the maximum at the output terminal 239.

Further, the present load components 217, 219, 221, 223 are also supplied to a maximum determination module 236 which determines the maximum 238 of the present load components at a terminal 240 reflecting the life time usage weight or maximum load rate change.

In particular, the acceleration represented by acceleration signals 203, 204 is projected to four sectors (angular sectors) and afterwards the sectorwise load (load in the individual sectors) is calculated or estimated. Thereby, the nacelle accelerations could be measured with a 2-axis accelerometer and may be projected to four sectors as a function of the yaw position.

Figure 3:
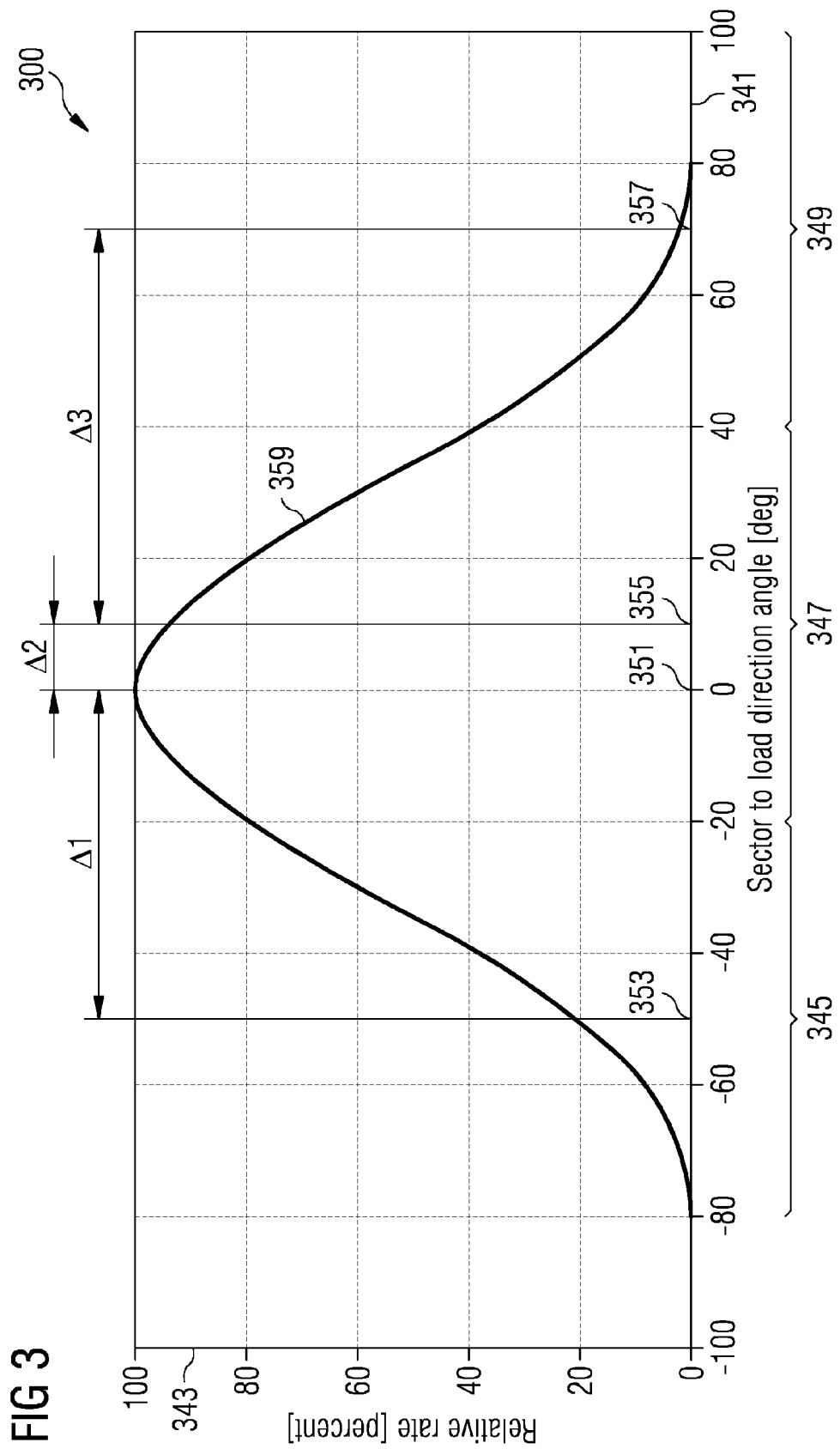
FIG. 3 illustrates a graph related to a method for determining a total mechanical load performed by the arrangements illustrated in FIG. 1 or 2.

FIG. 3 illustrates a graph 300, wherein an abscissa 341 indicates an angle or an angular position (along a circumference of the wind turbine tower) and an ordinate 343 indicates a relative load or relative acceleration depending on whether the load distribution module 113 (in FIG. 1) is used or the projection module 206 (in FIG. 2) is used.

As an example a first (circumferential) sector 345 ranges from −80° to −20°, a second angular sector 347 ranging from −20° to +40° and a third sector 349 ranging from +40° to +100° are illustrated, wherein the angle intervals covered by the angular sectors may also be different from the illustrated angular range, such that the angular range may be for example 90° according to an embodiment, where four angular sectors are supported.

The present angular direction (representing the direction along which the present load acts on the turbine, such as the wind direction or a direction opposite to the wind direction) is here assumed to be located at the angle of 0° and is indicated by reference sign 351. As a central angle 353 the first angular sector 345 has the angle of −50°. The central angle 353 represents a mid-point of the angle range covered or spanned by the first angular sector 345. Similarly, the second angular sector 347 has a central angle 355 which amounts to +10° and the third angular sector 349 has as a central angle 357 which amounts to +70°.

The curve 359 represents the respective portion P of the load (or the acceleration) which is attributed to the different angular sectors 345, 347, 349, wherein this portion clearly depends on a difference between the present angular direction 351 and the respective mid-point or central angle 353, 355 or 357 of the respective angular sections or sectors 345, 347, 349, respectively. The curve 349 may be described by the following formula:

$$P = L * \cos(\Delta)^{3.5}$$

wherein L is the present load. $\Delta$ is the difference between the central angle of the considered sector and the angle representing the present angular direction of the acting load.

Thereby, in the example of FIG. 3 the portion P of the acceleration or load acting in the direction of the respective angular factors may be derived from the present load L and the differences $\Delta 1$, $\Delta 2$, $\Delta 3$ between the central angles 353, 355, 357 from the angle representing the present angular direction of the acting load.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for determining a mechanical load of a wind turbine, comprising:
    obtaining a present load signal indicative of a present load of a wind turbine base structure, the present load acting in a present angular direction;
    deriving a first present load and a second present load based upon the present load signal and the present angular direction, wherein the first present load is associated with a first angular sector of the wind turbine and the second present load is associated with a second angular sector of the wind turbine; and
    determining a mechanical load of the wind turbine based upon the first present load and the second present load.

2. The method according to claim 1, further comprising:
    obtaining a subsequent load signal indicative of a subsequent load of the wind turbine base structure, the subsequent load acting in a subsequent angular direction;
    deriving a first subsequent load and a second subsequent load based upon the subsequent load signal and the subsequent angular direction, wherein the first subsequent load is associated with the first angular sector and the second subsequent load is associated with the second angular sector;
    determining a first mechanical sub-load by summing the first present load with the first subsequent load;
    determining a second mechanical sub-load by summing the second present load with the second subsequent load; and
    combining the first mechanical sub-load and the second mechanical sub-load resulting in the mechanical load.

3. The method according to claim 2, wherein a maximum of the first mechanical sub-load and the second mechanical sub-load is determined.

4. The method according to claim 1, wherein a maximum of the first present load and the second present load is determined.

5. The method according to claim 1, further comprising:
    obtaining a further present load signal indicative of a further present load of the wind turbine base structure, the further present load acting in a further present angular direction,
    wherein the deriving of the first present load and the second present load is further based upon the further present load signal and the further present angular direction.

6. The method according to claim 5, further comprising:
    deriving a third present load and a fourth present load based upon the present load signal and/or the further present load signal and the present angular direction and/or the further present angular direction,
    wherein the third present load is associated with a third angular sector of the wind turbine and the fourth present load is associated with a fourth angular sector,
    wherein the first angular sector spans 90° and the second angular sector spans 90°.

7. The method according to claim 5,
    wherein obtaining the present load signal comprises
        obtaining a present acceleration signal indicative for a present acceleration of the wind turbine in the present angular direction, and
        deriving the present load from the present acceleration signal.

8. The method according to claim 7, further comprising:
    deriving a first present acceleration and a second present acceleration based upon the present acceleration signal and the present angular direction, wherein the first present acceleration is associated with the first angular sector of the turbine and the second present acceleration is associated with the second angular sector of the turbine;
    deriving the first present load based upon the first present acceleration;
    deriving the second present load based upon the second present acceleration.

9. The method according to claim 7, wherein the present acceleration signal is obtained from an accelerometer arranged in a nacelle of the wind turbine.

10. The method according to claim 5,
    wherein obtaining the further present load signal comprises obtaining a further present acceleration signal indicative for a further present acceleration of the wind turbine in the further present angular direction, and deriving the further present load from the further present acceleration signal.

11. The method according to claim 10, wherein the further present acceleration signal is obtained from an accelerometer arranged in a nacelle of the wind turbine.

12. The method according to claim 1, further comprising:
obtaining a present yaw signal indicative of a present yaw angle of the wind turbine, and
using the yaw signal to determine the present angular direction.

13. The method according to claim 1,
wherein obtaining the present load signal comprises obtaining a present strain signal indicative for a present strain of the wind turbine in the present angular direction, and deriving the present load from the present strain signal;
and/or
wherein obtaining the further load signal comprises obtaining a further strain signal indicative for a further present strain of the wind turbine in the further present angular direction, and deriving the further present load from the further present strain signal.

14. The method according to claim 13, wherein the strain signal and/or the further strain signal is obtained from a strain sensor and/or a further strain sensor, both sensors being strain gauge sensors, wherein the strain sensor is mounted at the wind turbine base structure within the first angular sector and the further strain sensor is mounted at the wind turbine base structure within the second angular sector.

15. The method according to claim 1,
wherein the first present load decreases when an angle difference between the present angular direction and a central angle of the first angular sector increases, and
wherein the first present load is derived as a product of the present load times a power of 3.5 of a cosine of the angle difference between the present angular direction and the central angle of the first angular sector.

16. Method of controlling a wind turbine, the method comprising:
performing a method according to claim 1; and
controlling the wind turbine based upon a determined mechanical load.

17. Arrangement for determining a mechanical load of a wind turbine, the arrangement comprising:
an input terminal for obtaining a present load signal indicative of a present load of a wind turbine base structure, the present load acting in a present angular direction; and
a processor configured
to derive a first present load and a second present load based upon the present load signal and the present angular direction, wherein the first present load is associated with a first angular sector of the turbine and the second present load is associated with a second angular sector of the turbine, and
to derive a mechanical load based upon the first present load and the second present load.

* * * * *